Dec. 19, 1922.
G. R. MAUPIN.
BOILER TOOL.
FILED DEC. 20, 1920.
1,439,570.
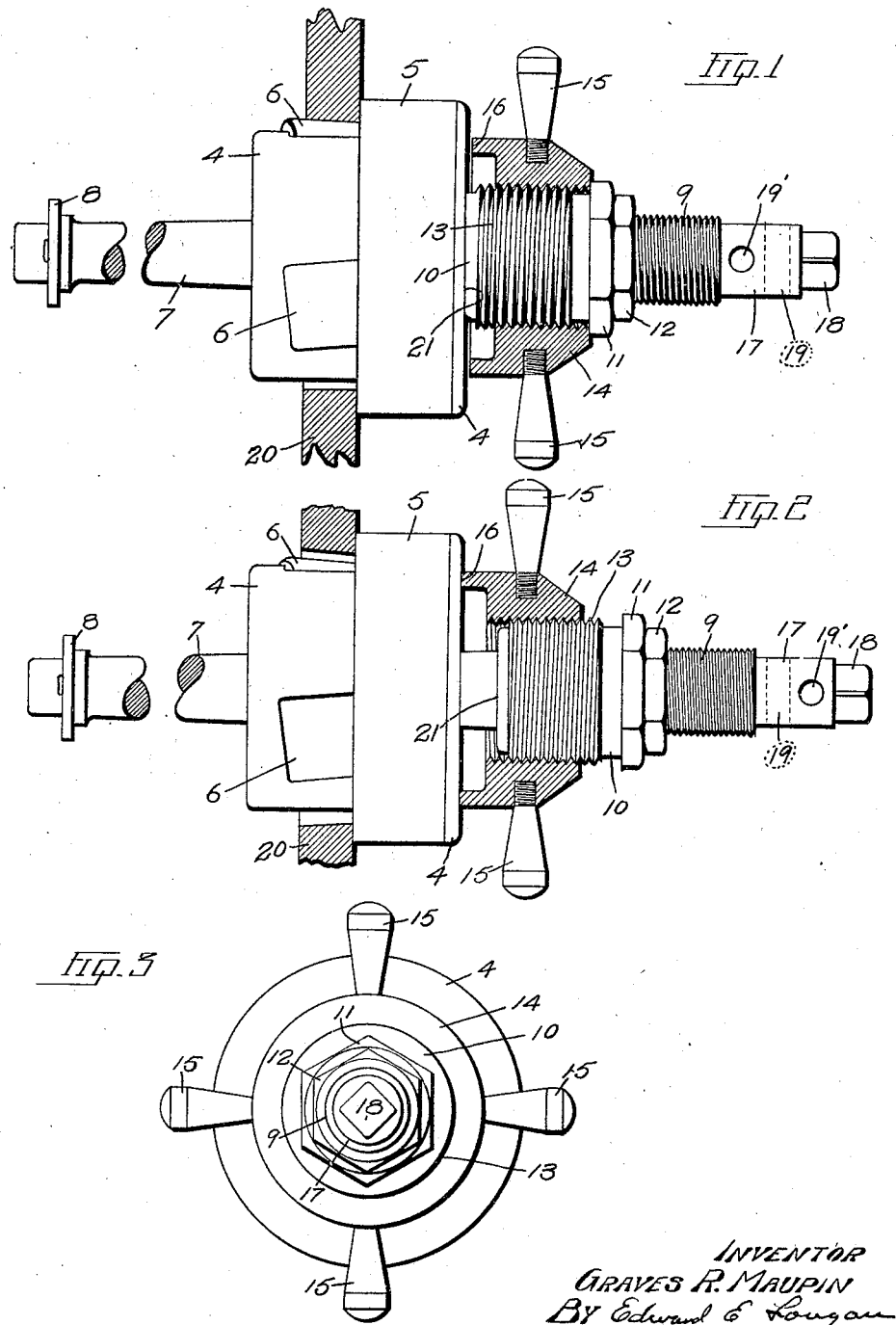
INVENTOR
GRAVES R. MAUPIN
BY Edward E. Lougan
ATTY.

Patented Dec. 19, 1922.

1,439,570

UNITED STATES PATENT OFFICE.

GRAVES R. MAUPIN, OF MOBERLY, MISSOURI, ASSIGNOR, BY MESNE ASSIGNMENTS, TO THE J. FAESSLER MANUFACTURING COMPANY, OF MOBERLY, MISSOURI, A CO-PARTNERSHIP COMPOSED OF JOHN W. FAESSLER, CHRISTINIA FAESSLER, LOUIS E. FAESSLER, AND GRAVES R. MAUPIN.

BOILER TOOL.

Application filed December 20, 1920. Serial No. 431,887.

*To all whom it may concern:*

Be it known that I, GRAVES R. MAUPIN, a citizen of the United States, and resident of the city of Moberly, county of Randolph, and State of Missouri, have invented certain new and useful Improvements in Boiler Tools, of which the following is a specification containing a full, clear, and exact description, reference being had to the accompanying drawings, forming a part hereof.

My invention relates to improvements in boiler tools and has for its primary object a boiler tool which is adapted for rolling boiler tube sheets and expanding flues, and the like, and which is equipped with a depth gauge and a mandril remover.

A further object is to equip a boiler tool of the expanding roller type with a mandril remover which is so constructed that the mandril will be fed out of the work without the necessity of reversing the rotation of the mandril. This makes a tool especially desirable where mechanical power, such as electric or air motors, are used in boiler work.

In the drawings:

Fig. 1 is a side elevation of my device showing the same in position after the depth gauge is contacted with the cage, with portions in section.

Fig. 2 is a similar view showing the mandril remover in operation and the mandril partially withdrawn.

Fig. 3 is an end view, viewing the same from the operating end of the mandril.

In the construction of my device I employ a tool having a cage 4. To this cage is swivelly mounted the thrust collar 5. Secured in the cage and mounted at an angle to its axis are the expanding rollers 6. Extending centrally through the cage is a tapered mandril 7 with which the rollers contact and which forces the rollers outward from the cage. This mandril is provided adjacent its one tapered end with a washer 8, which will prevent its entire withdrawal from the cage. The other end of the mandril adjacent the tapered portion 7 is provided with a cylindrically screw threaded portion 9. These screw threads are right-hand and on the screw threaded portion is mounted the depth gauge 10. This depth gauge is adjusted along the screw threaded portion by means of a wrench engaging surface 11. Mounted on the screw threaded portion 9 is a lock nut 12 the purpose of which is to securely lock the depth gauge and prevent its moving while the device is in operation. The depth gauge is cylindrical in form and its outer face is provided with left-hand screw threads 13 and over its screw threaded portion is secured the mandril remover 14. The mandril remover 14 is provided with handles 15, which permit its being turned on the screw threads 14 and fed forward so that its edge 16 can be brought in contact with the outer face of the cage 4. The mandril is also provided with a cylindrical projection 17 formed adjacent the screw threaded portion 19 and with the square end portion 18, which is adjacent the cylindrical portion 17. The cylindrical portion 17 is provided with openings 19′ for the insertion of a bar, by means of which the mandril can be turned and the square portion 18 is designed to fit in the chuck of an air or electric motor, such as is used for drilling purposes.

The operation of my device is as follows:

The depth gauge is first adjusted on the cylindrical portion 19 so that the rollers 6 can only be forced outward from the cage a certain distance, the cage is then inserted within an opening formed in the boiler sheet 20,—the thrust collar 5 limiting the depth of insertion. At this time the mandril remover 14 is screwed backward so that it rests against the wrench engaging surface 11, thus leaving the forward end 21 of the depth gauge free from contact with the cage 4. The mandril is then turned and fed forward through the cage, thus expanding the rollers 6 and enlarging and forming a seat within the hole in the boiler sheet. When the desired size of the hole has been reached the edge or face 21 of the depth gauge comes in contact with the cage 4 and thus prevents any further insertion of the mandril. The mandril remover is now rotated on the depth gauge and being secured thereto by screw threads is brought forward until its edge 16 contacts with the cage 4. The mandril is then rotated in the same direction as when expanding the rollers 6. This direction being right handed, will have a tendency to screw the depth gauge outwardly from the mandril remover 14. This outward screwing of the depth gauge will have the tendency to force the mandril remover more tightly against the cage 4 and thus force the mandril backward or withdraw it from the cage.

I have found it preferable in placing the rollers in the cage to set them at an angle to the axis of the mandril and of the cage so that the turning of the mandril will have a tendency to draw the mandril inwardly and I have found that by this method it is possible to insert an enormous pressure on the rollers 6. This pressure has at times been so great that it was very difficult to withdraw the mandril sufficiently to remove the cage from the finished hole or from the boiler tube. By the use of my device this withdrawal is easily accomplished, as the remover when next brought in contact with the face of the cage 4 will withdraw the mandril no matter how great the pressure which has been exerted on the rollers may be.

Having fully described my invention, what I claim is:

1. A boiler tool comprising a cage, rollers mounted in said cage and extending through the sides thereof, a tapered mandril extending through said cage, a screw threaded depth gauge secured on said mandril, and a mandril remover movably secured on said depth gauge.

2. A boiler tool comprising a roller cage, a mandril extending through said cage, an internally and externally screw threaded depth gauge mounted on said mandril, and a mandril remover mounted on said external screw threads.

3. A boiler tool comprising a roller cage, a mandril, right hand screw threads formed near one end of said mandril, a gauge secured on said threads, left hand screw threads formed on said gauge, and a mandril remover mounted on said last mentioned screw threads, said mandril remover adapted to withdraw the mandril from the cage.

In testimony whereof, I have signed my name to this specification.

GRAVES R. MAUPIN.